United States Patent
Someya et al.

(10) Patent No.: US 7,609,427 B2
(45) Date of Patent: Oct. 27, 2009

(54) IMAGE DISPLAY APPARATUS AND IMAGE DISPLAY METHOD

(75) Inventors: Jun Someya, Tokyo (JP); Shuichi Kagawa, Tokyo (JP); Hideki Yoshii, Tokyo (JP); Tomohiro Sasagawa, Tokyo (JP); Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 304 days.

(21) Appl. No.: 11/812,215

(22) Filed: Jun. 15, 2007

(65) Prior Publication Data
US 2008/0018972 A1 Jan. 24, 2008

(30) Foreign Application Priority Data
Jul. 21, 2006 (JP) ............................. 2006-199021

(51) Int. Cl.
G02B 26/08 (2006.01)
(52) U.S. Cl. .................................... 359/204.1
(58) Field of Classification Search ................. 347/241, 347/243; 359/198.1–226.1; 250/234–236
See application file for complete search history.

(56) References Cited

U.S. PATENT DOCUMENTS 6,529,289 B1 * 3/2003 Konno et al. ............... 358/1.17

FOREIGN PATENT DOCUMENTS

| JP | 9-134135 A | 5/1997 |
| JP | 2003-43975 A | 2/2003 |
| JP | 2003-266757 A | 9/2003 |

* cited by examiner

Primary Examiner—Euncha P Cherry
(74) Attorney, Agent, or Firm—Birch, Stewart, Kolasch & Birch, LLP

(57) ABSTRACT

An image display apparatus includes a light source for emitting a plurality of light beams arranged in a direction corresponding to a sub-scanning direction, a light source driver for individually modulating intensities of the plurality of light beams; a light scanning unit for performing main scanning and sub-scanning; an image display screen for receiving the plurality of light beams scanned in the main and sub-scanning directions; and a controller, wherein, in one frame period, a distance of movement of the light irradiation positions on the image display screen moved by one sub-scanning is a distance obtained by multiplying an interval between adjacent two scanning lines in the sub-scanning direction on the image display screen by a predetermined integer which is an integer smaller than number of the plurality of light beams arranged in the direction corresponding to the sub-scanning direction.

18 Claims, 12 Drawing Sheets

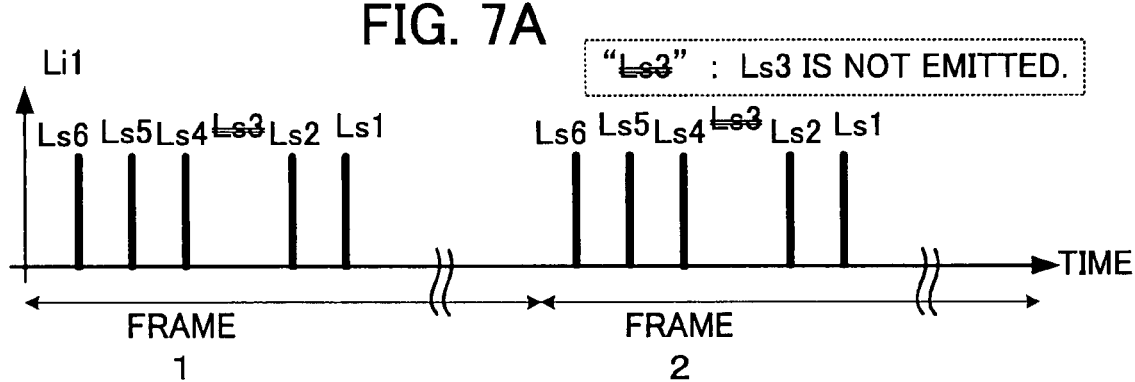
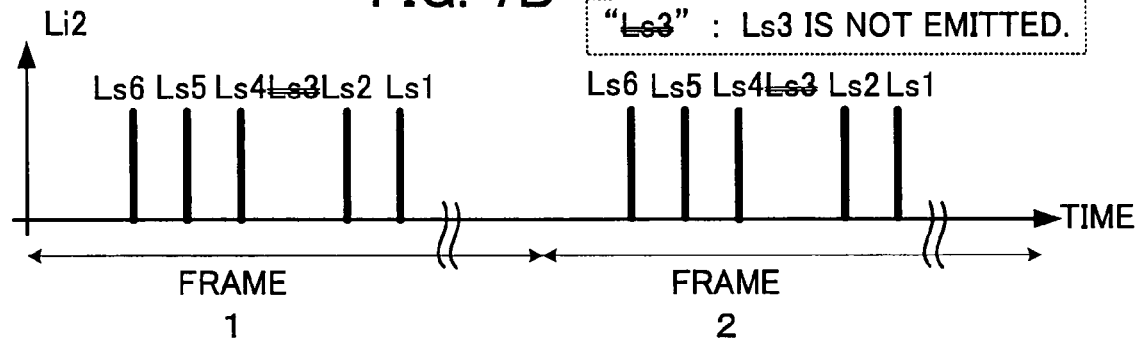
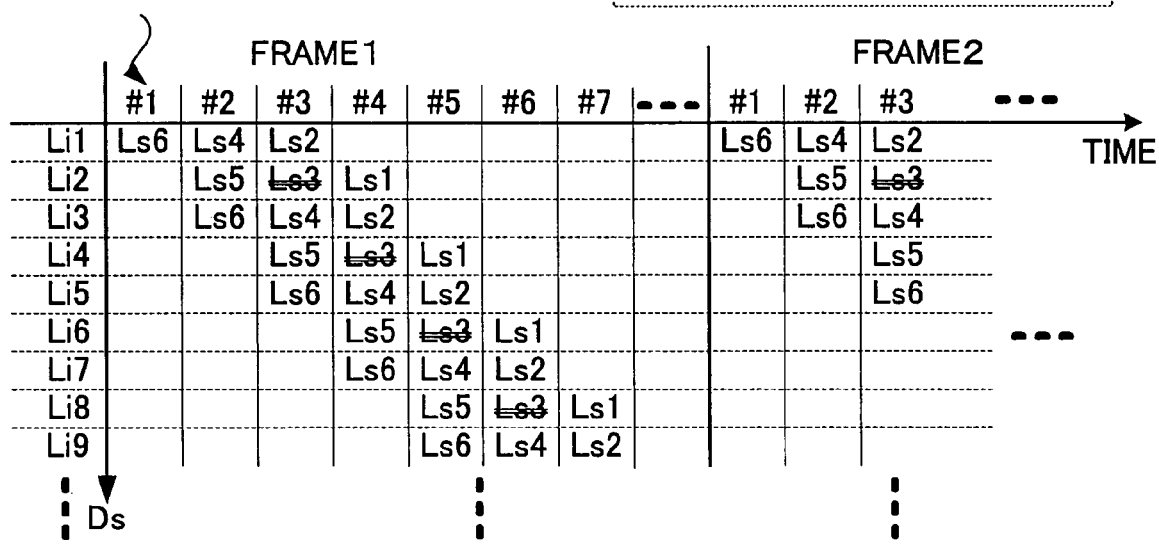

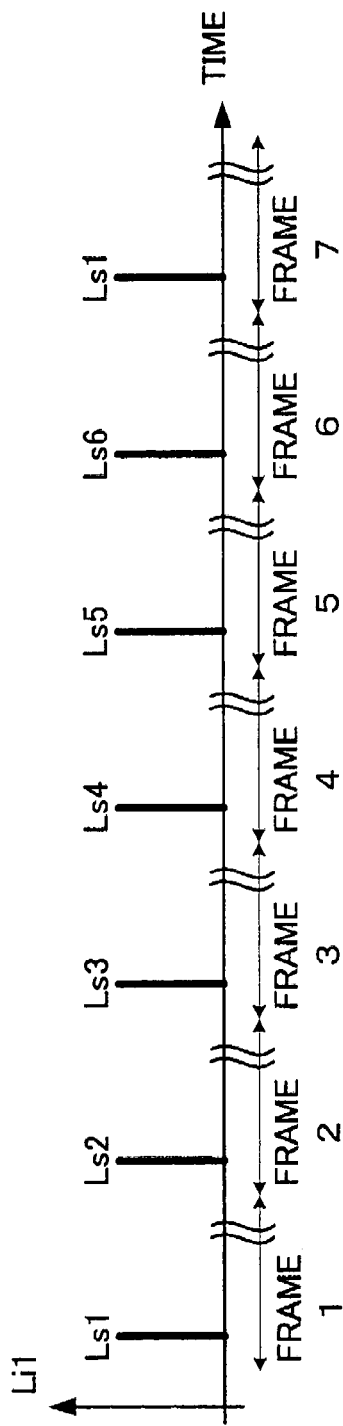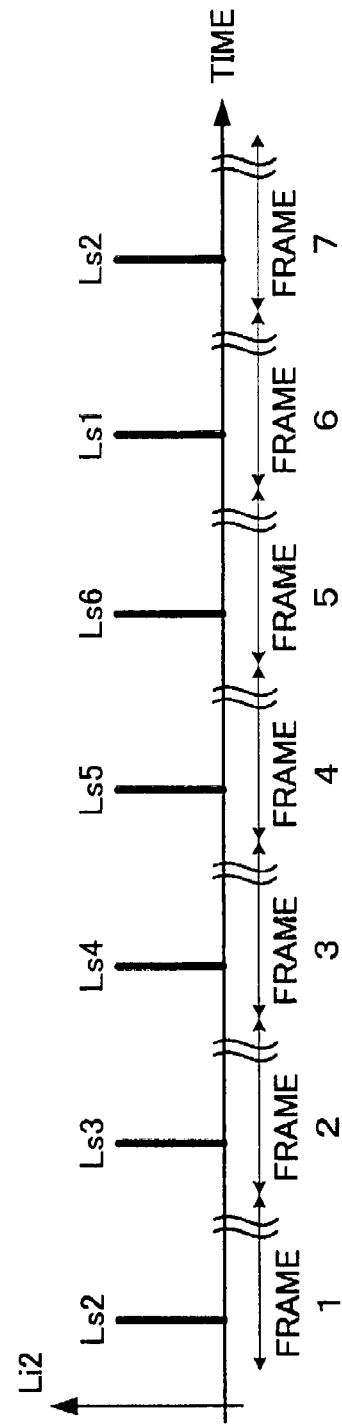

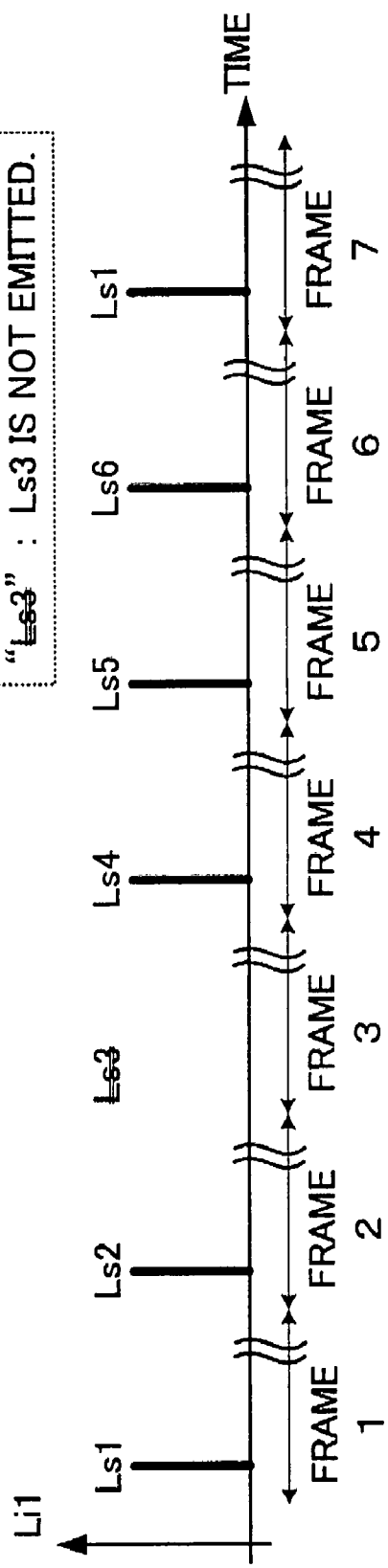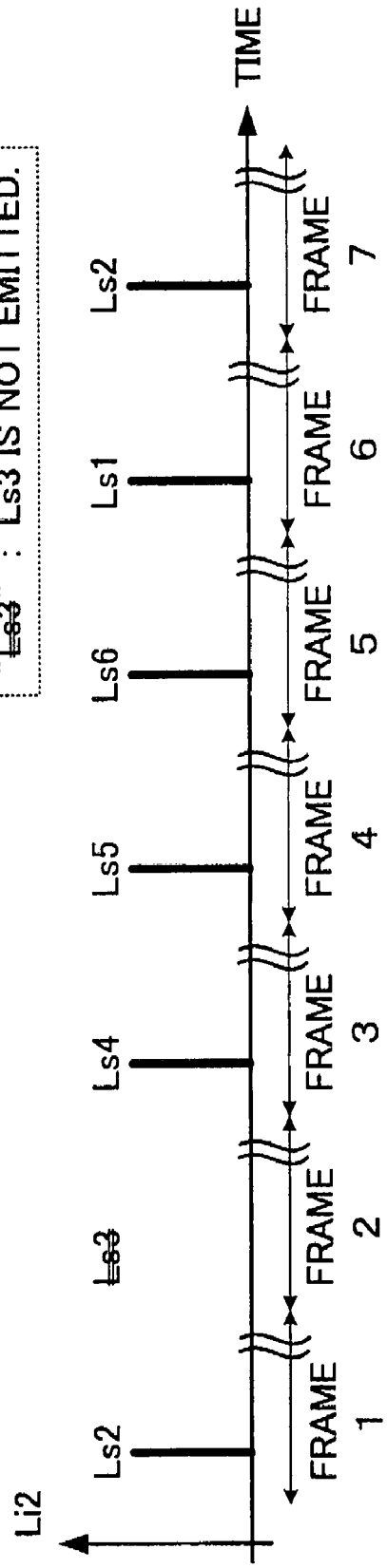

FIG. 15

| | FRAME1 | | | FRAME2 | | | FRAME3 | | | |
|---|---|---|---|---|---|---|---|---|---|---|
| MAIN SCANNING ↙ | #1 | #2 | #3 --- | #1 | #2 | #3 --- | #1 | #2 | #3 --- | → TIME |
| Li1 | Ls4 | Ls1 | | Ls5 | Ls2 | | Ls6 | Ls3 | | |
| Li2 | Ls5 | Ls2 | | Ls6 | Ls3 | | | Ls4 | Ls1 | |
| Li3 | Ls6 | Ls3 | | | Ls4 | Ls1 | | Ls5 | Ls2 | |
| Li4 | | Ls4 | Ls1 | | Ls5 | Ls2 | | Ls6 | Ls3 | |
| Li5 | | Ls5 | Ls2 | | Ls6 | Ls3 | | | Ls4 | |
| Li6 | | Ls6 | Ls3 | | | Ls4 | | | Ls5 | |
| Li7 | | | Ls4 | | | Ls5 | | | Ls6 | |
| Li8 | | | Ls5 | | | Ls6 | | | | |
| ↓ Ds | ⋮ | | | ⋮ | | | ⋮ | | | |

FIG. 16

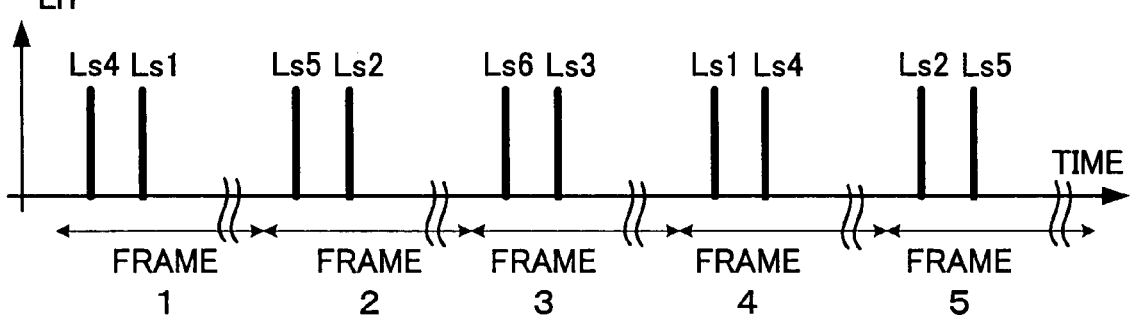

FIG. 17

"L̶s̶3̶" : Ls3 IS NOT EMITTED.

| | FRAME1 | | | FRAME2 | | | FRAME3 | | | |
|---|---|---|---|---|---|---|---|---|---|---|
| MAIN SCANNING ↙ | #1 | #2 | #3 --- | #1 | #2 | #3 --- | #1 | #2 | #3 --- | → TIME |
| Li1 | Ls4 | Ls1 | | Ls5 | Ls2 | | Ls6 | L̶s̶3̶ | | |
| Li2 | Ls5 | Ls2 | | Ls6 | L̶s̶3̶ | | | Ls4 | Ls1 | |
| Li3 | Ls6 | L̶s̶3̶ | | | Ls4 | Ls1 | | Ls5 | Ls2 | |
| Li4 | | Ls4 | Ls1 | | Ls5 | Ls2 | | Ls6 | L̶s̶3̶ | |
| Li5 | | Ls5 | Ls2 | | Ls6 | L̶s̶3̶ | | | Ls4 | |
| Li6 | | Ls6 | L̶s̶3̶ | | | Ls4 | | | Ls5 | |
| Li7 | | | Ls4 | | | Ls5 | | | Ls6 | |
| Li8 | | | Ls5 | | | Ls6 | | | | |
| ↓ Ds | ⋮ | | | ⋮ | | | ⋮ | | | |

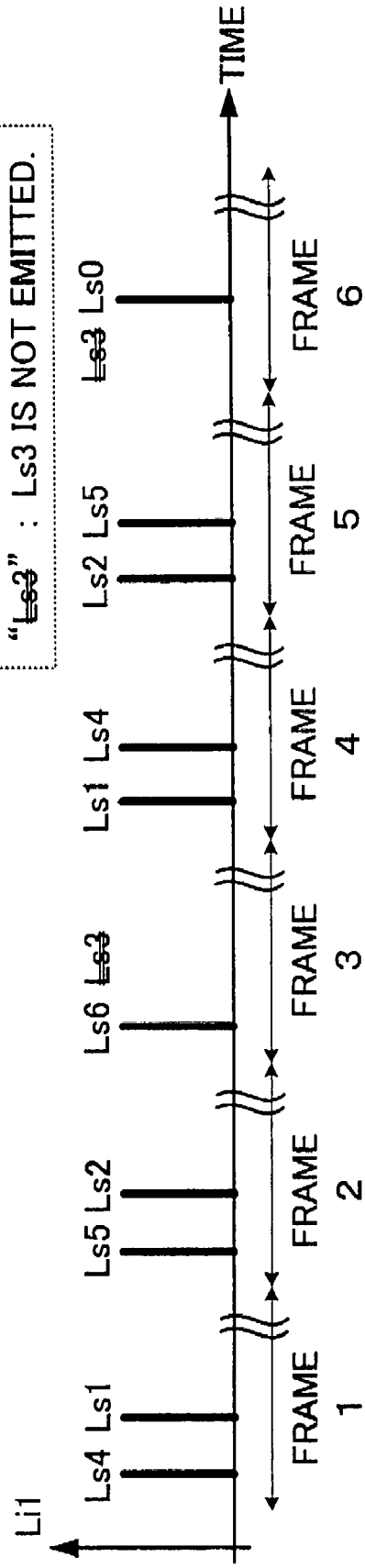
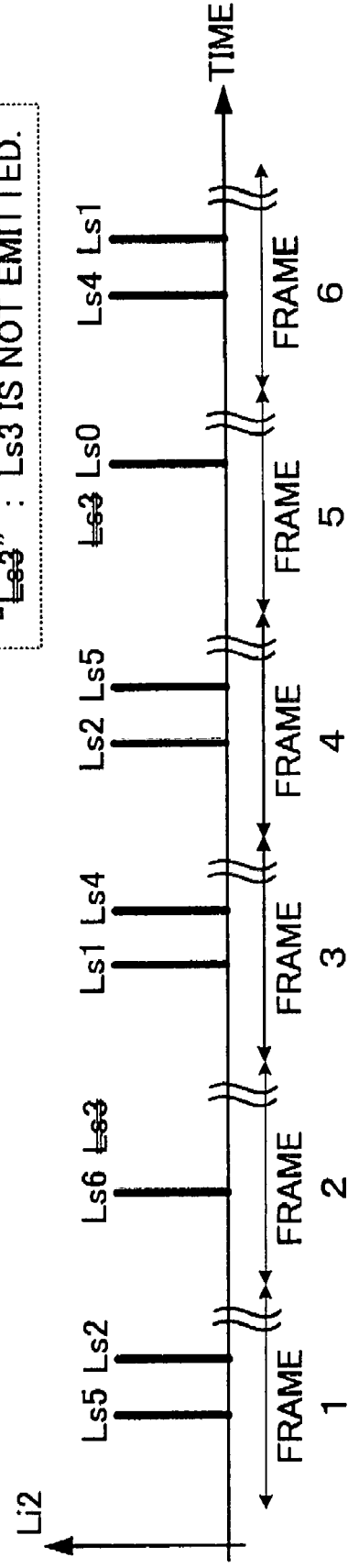

IMAGE DISPLAY APPARATUS AND IMAGE DISPLAY METHOD

BACKGROUND OF THE INVENTION

1. Field of the Invention

The present invention relates to an optical scanning type image display apparatus and method, in which light beams modulated in accordance with input image data are two-dimensionally scanned to display an image.

2. Description of the Related Art

In an image display apparatus using a light beam such as a laser beam, an image is displayed by two-dimensionally scanning a light beam while modulating the intensity of the light beam in accordance with input image data. Japanese Patent Application Kokai (Laid-Open) Publication No. 9-134135 (Patent Document 1) and Japanese Patent Application Kokai (Laid-Open) Publication No. 2003-43975 (Patent Document 2) disclose each an image display apparatus and method, in which a plurality of pixels is displayed at the same time by independently modulating a plurality of light beams. Since the simultaneous display of the plurality of pixels enables reduction of number of pixels to be displayed by each of the light beams, the intensity of the light beam can be modulated with a low modulation frequency.

The image display apparatus disclosed in the Patent Document 1 displays an image with use of a plurality of light beams in order to lower the modulation frequency of the light beams. The image display apparatus disclosed in the Patent Document 2, on the other hand, displays an image with use of a plurality of light beams in order to obtain a bright image. However, in the image display apparatus which is arranged so as to display different pixels at the same time with use of the respective light beams, a problem occurs that irregularities or inconsistencies in brightness appear in the displayed image, when there are variations in intensity between the light beams or when any of the light beams cannot be emitted due to the fact that any of a plurality of light emitting elements for outputting the light beams is faulty.

SUMMARY OF THE INVENTION

It is therefore an object of the present invention to provide an image display apparatus and an image display method, which can display an image without brightness irregularities even when there are variations in intensity between light beams emitted from a plurality of light emitting elements of a light source or even when any of the light emitting elements is faulty and cannot emit the light beam.

According to an aspect of the present invention, an image display apparatus includes a light source which includes a plurality of light emitting elements for emitting a plurality of light beams arranged in a direction corresponding to a sub-scanning direction on an image display screen; a light source driver which individually modulates intensities of the plurality of light beams in accordance with input image data; a light scanning unit which performs main scanning and sub-scanning in such a way that light irradiation positions on the image display screen that are irradiated with the plurality of light beams are moved in a main scanning direction on the image display screen during the main scanning and the light irradiation positions are moved in the sub-scanning direction during the sub-scanning; the image display screen which receives the plurality of light beams scanned in the main scanning direction and the sub-scanning direction by the light scanning unit, thereby causing an image to be displayed; and a controller which controls the light scanning unit so as to perform one sub-scanning each time that the plurality of light beams are scanned in the main scanning direction. I one frame period, a distance of movement of the light irradiation positions on the image display screen moved by one sub-scanning is a distance obtained by multiplying an interval between adjacent two scanning lines in the sub-scanning direction on the image display screen by a predetermined integer which is an integer smaller than number of the plurality of light beams arranged in the direction corresponding to the sub-scanning direction.

According to another aspect of the present invention, an image display apparatus includes a light source which includes a plurality of light emitting elements for emitting a plurality of light beams arranged in a direction corresponding to a sub-scanning direction on an image display screen; a light source driver which individually modulates intensities of the plurality of light beams in accordance with input image data; a light scanning unit which performs main scanning and sub-scanning in such a way that light irradiation positions on the image display screen that are irradiated with the plurality of light beams are moved in a main scanning direction on the image display screen during the main scanning and the light irradiation positions are moved in the sub-scanning direction during the sub-scanning; the image display screen which receives the plurality of light beams scanned in the main scanning direction and the sub-scanning direction by the light scanning unit, thereby causing an image to be displayed; and a controller which controls the light scanning unit so as to perform one sub-scanning each time that the plurality of light beams are scanned in the main scanning direction. The controller controls the light scanning unit in such a way that scanning lines of the main scanning at the same light irradiation position in previous frame and current frame are displayed by the main scanning of different ones of the plurality of light beams arranged in the direction corresponding to the sub-scanning direction.

According to a further aspect of the present invention, an image display method includes the steps of: emitting a plurality of light beams arranged in a direction corresponding to a sub-scanning direction on an image display screen from a plurality of light emitting elements of a light source, intensities of the plurality of light beams being individually modulated in accordance with input image data; and performing main scanning and sub-scanning by a light scanning unit in such a way that light irradiation positions on the image display screen that are irradiated with the plurality of light beams are moved in a main scanning direction on the image display screen during the main scanning and the light irradiation positions are moved in the sub-scanning direction during the sub-scanning, one sub-scanning being performed each time that the plurality of light beams are scanned in the main scanning direction. In one frame period, a distance of movement of the light irradiation positions on the image display screen moved by one sub-scanning is a distance obtained by multiplying an interval between adjacent two scanning lines in the sub-scanning direction on the image display screen by a predetermined integer which is an integer smaller than number of the plurality of light beams arranged in the direction corresponding to the sub-scanning direction.

According to a yet further aspect of the present invention, an image display method includes the steps of: emitting a plurality of light beams arranged in a direction corresponding to a sub-scanning direction on an image display screen from a plurality of light emitting elements of a light source, intensities of the plurality of light beams being individually modulated in accordance with input image data; and performing main scanning and sub-scanning by a light scanning unit in such a way that light irradiation positions on the image display screen that are irradiated with the plurality of light beams are moved in a main scanning direction on the image display screen during the main scanning and the light irradiation positions are moved in the sub-scanning direction during the sub-scanning, one sub-scanning being performed each time that the plurality of light beams are scanned in the main scanning direction. The controller controls the light scanning unit in such a way that scanning lines of the main scanning at the same light irradiation position in previous frame and current frame are displayed by the main scanning of different ones of the plurality of light beams arranged in the direction corresponding to the sub-scanning direction.

In accordance with the image display apparatus and the image display method of the present invention, since sub-scanning is controlled so that the same scanning line is scanned by a plurality of times with light beams emitted from different ones of the light emitting elements, the image display apparatus and the image display method can advantageously reduce brightness irregularities in a displayed image caused by characteristic variations between the light emitting elements of the light source or by a defect in the light emitting elements.

Further, in accordance with the image display apparatus and the image display method of the present invention, even when part of the plurality of light emitting elements of the light source is faulty and cannot emit the corresponding light beam, the image without brightness irregularities can be displayed. Thus, the present invention has merits that a yield of the light source can be increased and that a usable period of time of the light source can be prolonged.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4A and 4B are diagrams for explaining operation of an image display apparatus according to the first embodiment (that is, an image display method according to the first embodiment) of the present invention, wherein FIG. 4A shows a relation between a scanning line and a pixel coordinate based on main scanning and FIG. 4B shows which laser beam of a plurality of laser beams displays the respective scanning lines;

FIGS. 7A and 7B are diagrams for explaining operation of the image display apparatus according to the first embodiment when one of the light emitting elements of the light source is faulty and cannot emit a laser beam, wherein FIG. 7A shows timing of main scanning and laser beams for the main scanning in the first scanning line of each frame and FIG. 7B shows timing of main scanning and laser beams for the main scanning in the second scanning line of each frame;

FIG. 8 is a diagram for explaining operation of an image display apparatus according to the second embodiment (that is, an image display method according to the second embodiment) of the present invention, and shows which laser beam of a plurality of laser beams displays the respective scanning lines when one of light emitting elements of a light source is faulty and cannot emit a light beam;

FIGS. 9A and 9B are diagrams for explaining operation of the image display apparatus according to the second embodiment of the present invention when one of the light emitting elements in the light source is faulty and cannot emit a laser beam, wherein FIG. 9A shows timing of main scanning and laser beams for the main scanning in the first scanning line of each frame and FIG. 9B shows timing of main scanning and laser beams for the main scanning in the second scanning line of each frame;

FIGS. 10A and 10B are diagrams for explaining another operation of the image display apparatus according to the second embodiment when one of the light emitting elements in the light source is faulty and cannot emit a laser beam, wherein FIG. 10A shows timing of main scanning and laser beams for the main scanning in the first scanning line of each frame and FIG. 10B shows timing of main scanning and laser beams for the main scanning in the second scanning line of each frame;

FIGS. 12A and 12B are diagrams for explaining operation of the image display apparatus according to the third embodiment, wherein FIG. 12A shows timing of main scanning in the first scanning line of each frame and FIG. 12B shows timing of main scanning in the second scanning line of each frame;

FIGS. 14A and 14B are diagrams for explaining operation of the image display apparatus according to the third embodiment when one of the light emitting elements in the light source is faulty and cannot emit a laser beam, wherein FIG. 14A shows timing of main scanning and laser beams for the main scanning in the first scanning line of each frame and FIG. 14B shows timing of main scanning and laser beams for the main scanning in the second scanning line of each frame;

FIG. 15 is a diagram for explaining operation of an image display apparatus according to the fourth embodiment (that is, an image display method according to the fourth embodiment) of the present invention, and shows which laser beam of a plurality of laser beams displays the respective scanning lines;

FIG. 16 is a diagram for explaining operation of the image display apparatus according to the fourth embodiment, and shows timing of main scanning and laser beams for the main scanning in the first scanning line of each frame;

FIG. 17 is a diagram for explaining operation of the image display apparatus according to the fourth embodiment, and shows which laser beam of a plurality of laser beams displays the respective scanning lines when one of light emitting elements in a light source is faulty and cannot emit a laser beam; and FIGS. 18A and 18B are diagrams for explaining operation of the image display apparatus according to the fourth embodiment when one of the light emitting elements in the light source is faulty and cannot emit a laser beam, wherein FIG. 18A shows timing of main scanning and laser beams for the main scanning in the first scanning line of each frame and FIG. 18B shows timing of main scanning and laser beams for the main scanning in the second scanning line of each frame.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
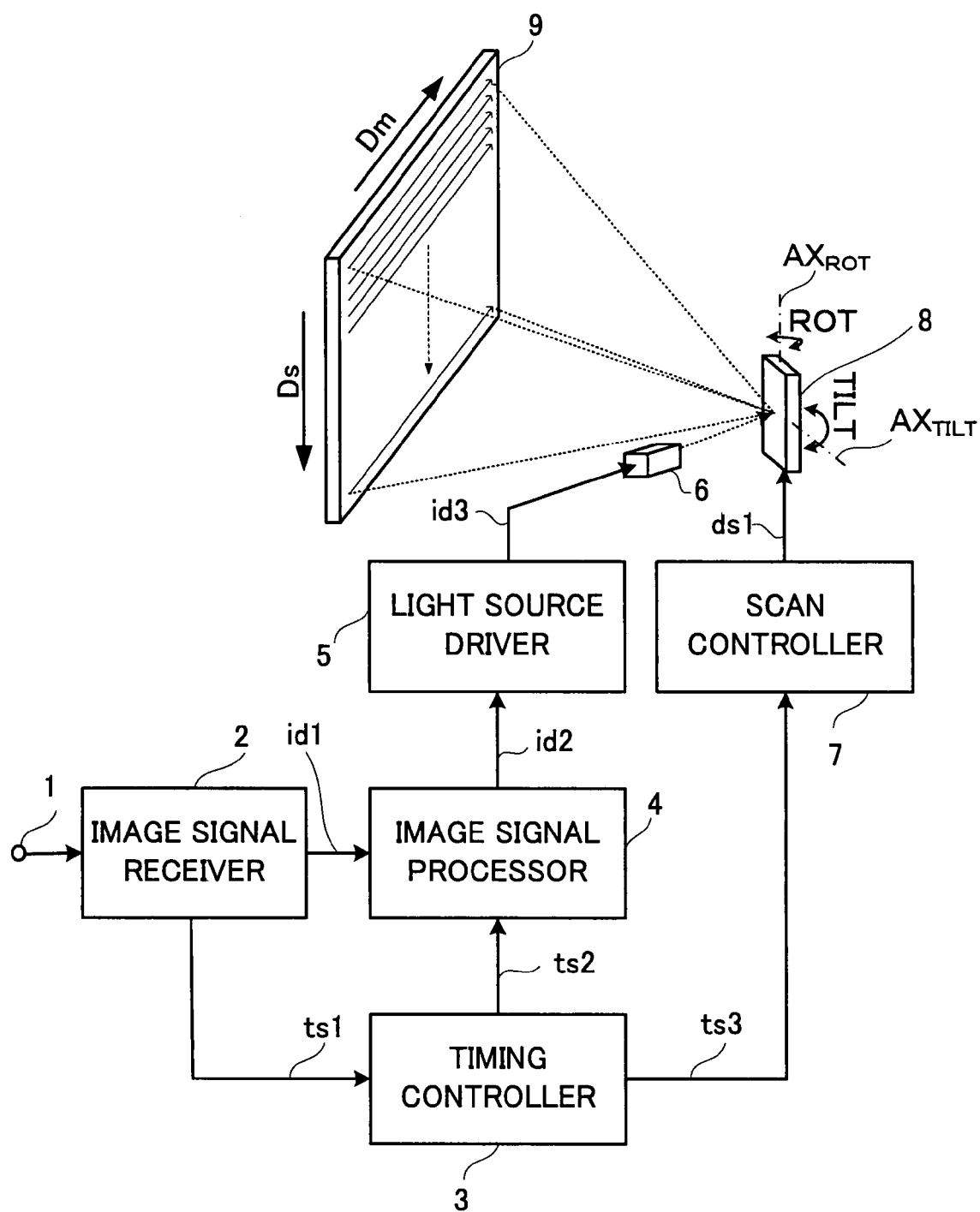
FIG. 1 is a diagram schematically showing a configuration of an image display apparatus according to the first to fourth embodiments of the present invention.

FIG. 1 is a diagram schematically showing a configuration of an image display apparatus according to the first embodiment of the present invention. As shown in FIG. 1, the image display apparatus according to the first embodiment includes an input terminal 1 to which an image signal is input, an image signal receiver 2, a timing controller 3, an image signal processor 4, a light source driver 5, a light source 6 which emits a plurality of light beams such as laser beams, a scan controller 7, a light scanning unit 8 including a rotary mirror and a means for driving the rotary mirror, and an image display screen 9. In FIG. 1, a reference symbol ROT denotes a rotational direction of the rotary mirror of the light scanning unit 8, and a reference symbol $AX_{ROT}$ denotes a rotational axis of the rotary mirror of the light scanning unit 8 in the main scanning mode. In FIG. 1, further, a reference symbol TILT denotes a direction of inclination of the rotary mirror of the light scanning unit 8 in the sub-scanning mode, and a reference symbol $AX_{TILT}$ denotes a inclined axis (rotational axis) of the rotary mirror of the light scanning unit 8 in the sub-scanning mode.

The image signal receiver 2 receives an image signal of a predetermined format for use in a television, a computer or the like via the input terminal 1, and converts the received image signal into image data id1 to output the image data id1. The image signal receiver 2 also generates a timing signal ts1 to output it with use of a synchronizing signal as a reference. The image signal receiver 2 includes an A/D converter when receiving an image signal of an analog type, or includes a demodulator of a predetermined type when receiving a modulated image signal.

The timing signal ts1 output from the image signal receiver 2 is input to the timing controller 3. The timing controller 3 outputs timing signals ts2 and ts3 to control operational timing of the image signal processor 4 and the scan controller 7 with use of the received timing signal ts1 as a reference.

The image data id1 output from the image signal receiver 2 is input to the image signal processor 4. The image signal processor 4 generates and outputs image data id2 of a plurality of scanning lines on the basis of the image data id1 in synchronism with the timing signal ts2 received from the timing controller 3.

The image data id2 output from the image signal processor 4 is input to the light source driver 5. The light source driver 5 generates a drive signal id3 on the basis of the image data id2 of the plurality of scanning lines received from the image signal processor 4 and outputs the drive signal id3 to the light source 6, thereby modulating the light beams emitted from the light source 6.

Figure 2:
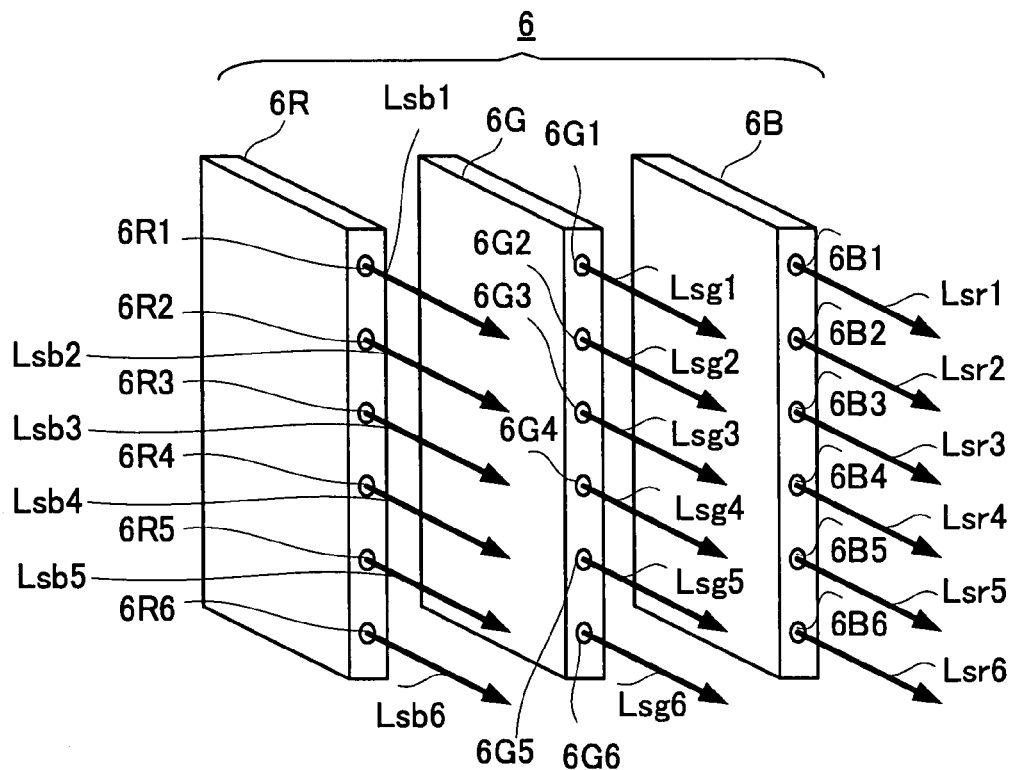
FIG. 2 is a perspective view schematically showing an example of a structure of a light source shown in FIG. 1.

FIG. 2 is a perspective view schematically showing an example of a structure of the light source 6 shown in FIG. 1. As shown in FIG. 2, the light source 6 includes three laser beam output blocks 6R, 6G, and 6B of red (R), green (G), and blue (B). The laser beam output blocks 6R, 6G, and 6B have a plurality of light emitting portions (that is, light emitting elements) 6R1 to 6R6, 6G1 to 6G6, and 6B1 to 6B6, respectively. The plurality of light emitting elements 6R1 to 6R6 for the red color are arranged in a direction corresponding to a sub-scanning direction Ds on the image display screen 9. The plurality of light emitting elements 6G1 to 6G6 for the green color are arranged in the direction corresponding to the sub-scanning direction Ds on the image display screen 9. The plurality of light emitting elements 6B1 to 6B6 for the blue color are arranged in the direction corresponding to the sub-scanning direction Ds on the image display screen 9. The laser beam output blocks 6R, 6G, and 6B simultaneously output a plurality of laser beams. FIG. 2 shows when the three laser beam output blocks 6R, 6G, and 6B simultaneously output six laser beams Lsr1 to Lsr6 for the red color, six laser beams Lsg1 to Lsg6 for the green color, and six laser beams Lsb1 to Lsb6 for the blue color. Each of the laser beams corresponds to a color signal for each of the scanning lines of the image data id2 issued from the image signal processor 4. Accordingly, for example, when the light source 6 is constructed to output eighteen laser beams, the image data id2 issued from the image signal processor 4 includes data of six scanning lines for each of the colors, so that the light source driver 5 outputs the drive signal id3 to individually modulate eighteen laser beams emitted from the light source 6 in accordance with the input image data id2. When it is desired to display a color image in this way, the construction that can emit a plurality of colors of laser beams is required.

Further, in FIG. 2, a plurality of colors of laser beams as such one pixel as to make up the laser beams Lsr1, Lsg1, and Lsb1 are applied at the same point or position on the image display screen 9. Such an optical system as to apply a plurality of laser beams at the same position on the image display screen 9 is well known. For example, such an optical system as disclosed in the aforementioned Patent Documents 1 and 2 may be employed. In FIG. 2, it is also possible to apply a plurality of colors of laser beams forming one pixel of the laser beams Lsr1, Lsg1, and Lsb1 at a position moved by a plurality of pixels on the same scanning line of the image display screen 9 in the main scanning direction Dm. In this case, in order to adjust the display position of the pixel of the laser beams, the image signal processor 4 adjusts output timing of color signals of R, G, and B. Such an optical system as to apply a plurality of laser beams at a position moved by a predetermined number of pixels on the image display screen 9 is also well known. For example, such optical system is disclosed in the aforementioned Patent Documents 1 and 2.

Furthermore, FIG. 2 shows a case where the light source 6 is made up of three laser beam output blocks 6R, 6G, and 6B corresponding to the primary colors of R, G, and B. However, the present invention is not limited to such an arrangement, but a beam output block of such another color as yellow, cyan or magenta may be provided in addition to the laser beam output blocks 6R, 6G, and 6B of red, green, and blue. In this case, the image signal processor 4 performs matrix operation or converting operation using a lookup table to generate the image data id2 corresponding to the number of primary colors on the basis of the input image data id1. A color reproduction range can be expanded by increasing the number of primary colors in the light source 6.

Figure 3:
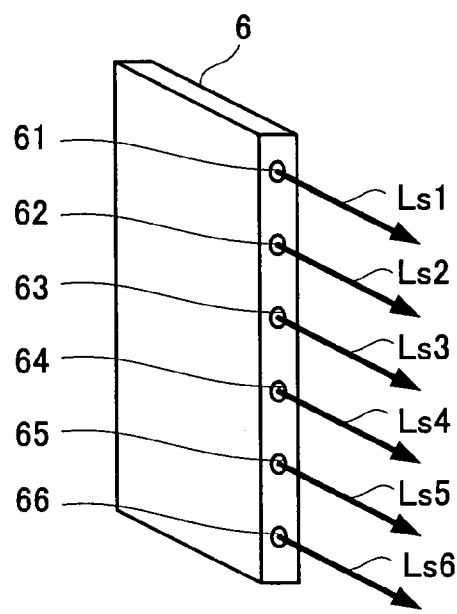
FIG. 3 is a perspective view schematically showing a structure of a simplified light source.

For easy understanding of the present invention, explanation will be made in connection with a case where the light source 6 is made of a single laser beam output block having six light emitting elements 61 to 66 as shown in FIG. 3.

Such a light source 6 as shown in FIG. 3 outputs laser beams Ls1 to Ls6 modulated independently on the basis of the drive signal id3. The output laser beams Ls1 to Ls6 having brightness of six pixels arranged in a direction corresponding to a sub-scanning direction are simultaneously emitted. At this time, the image signal processor 4 simultaneously outputs a plurality of pixel data corresponding to six scanning lines as the image data id2. Such operation can be easily attained by holding such pixel data in a temporary memory means such as a line memory for a necessary time and reading out it from the temporary memory means.

The plurality of laser beams Ls1 to Ls6 emitted from the light source 6 are scanned in the main scanning direction and sub-scanning direction by the light scanning unit 8, thereby displaying an image on the image display screen 9. At this time, when the main scanning and sub-scanning of the light scanning unit 8 and the laser beams issued from the light source 6 are operated with use of the timing signals ts2 and ts3 as references issued from the timing controller 3, a correct image can be displayed.

Figures 4A, 4B:
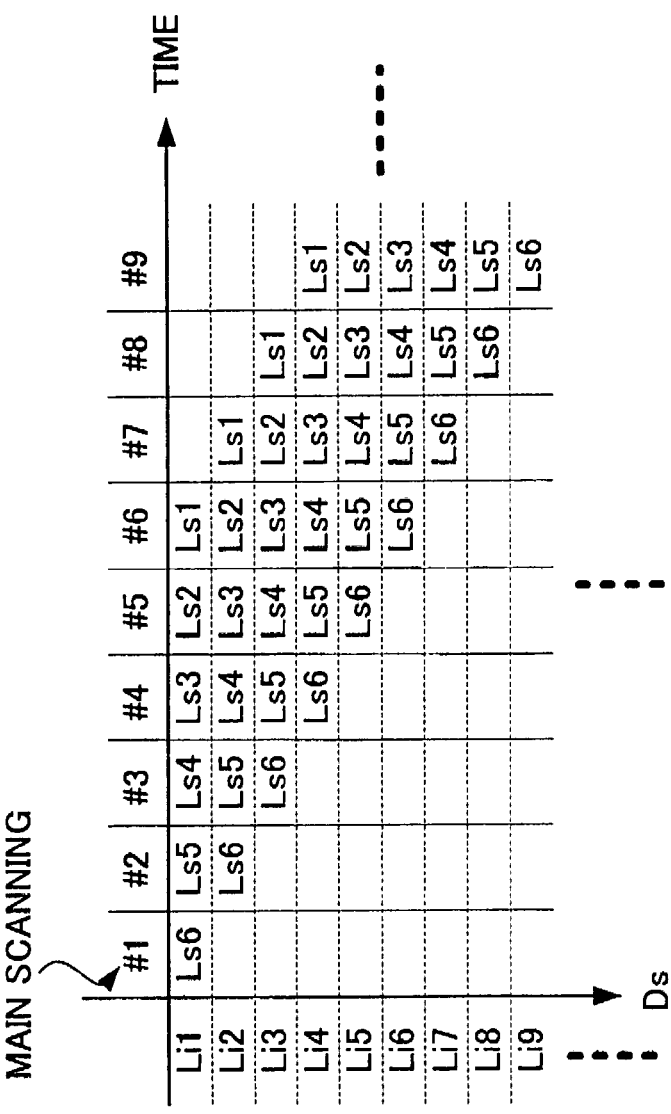

FIGS. 4A and 4B are diagrams for explaining operation of an image display apparatus according to the first embodiment (that is, an image display method according to the first embodiment), wherein FIG. 4A shows scanning lines Li1, Li2, . . . and a pixel coordinate P(x,y) based on main scanning, and FIG. 4B shows which laser beam of a plurality of laser beams Ls1 to Ls6 displays the respective scanning lines Li1, Li2, . . . .

FIG. 4A shows the scanning lines Li1, . . . , Li9 corresponding to the first to ninth scanning lines on the upper part of the image display screen 9. In FIG. 4A, a horizontal axis denotes a main scanning direction Dm, a vertical axis denotes a sub-scanning direction Ds, and P(x,y) denotes a pixel corresponding to the x-th pixel on the y-th scanning line Liy. In FIG. 4A, further, a reference symbol PL denotes an interval between adjacent scanning lines. FIG. 4B shows a relation between the scanning lines Li1, Li2, . . . shown in FIG. 4A and the laser beams Ls1 to Ls6. In FIG. 4B, a horizontal axis is a time axis, and a number attached to a symbol "#" indicates main scanning number, that is, number of times of main scanning in one frame period. Further, in FIG. 4B, a vertical axis denotes a sub-scanning direction Ds.

In FIGS. 4A and 4B, in the first main scanning (#1), the laser beam Ls6 displays pixels on the scanning line Li1. In the second main scanning (#2), the laser beam Ls5 display pixels on the first scanning line Li1, and the laser beam Ls6 displays pixels on the second scanning line Li2. Subsequently, the sub-scanning is sequentially carried out. In the ninth main scanning (#9), the laser beam Ls6 displays pixels on the ninth scanning line Li9, the laser beam Ls5 displays pixels on the eighth scanning line Li8, the laser beam Ls4 displays pixels on the seventh scanning line Li7, the laser beam Ls3 displays pixels on the sixth scanning line Li6, the laser beam Ls2 displays pixels on the fifth scanning line Li5, and the laser beam Ls1 displays pixels on the fourth scanning line Li4. In this manner, one sub-scanning is carried out for each main scanning until the laser beam Ls1 displays the final scanning line. The image signal processor 4 is arranged so as to extract the pixels on the scanning lines displayed by the laser beams Ls1 to Ls6 shown in FIGS. 4A and 4B from the received image signal and simultaneously outputting the extracted pixels.

Figure 5:
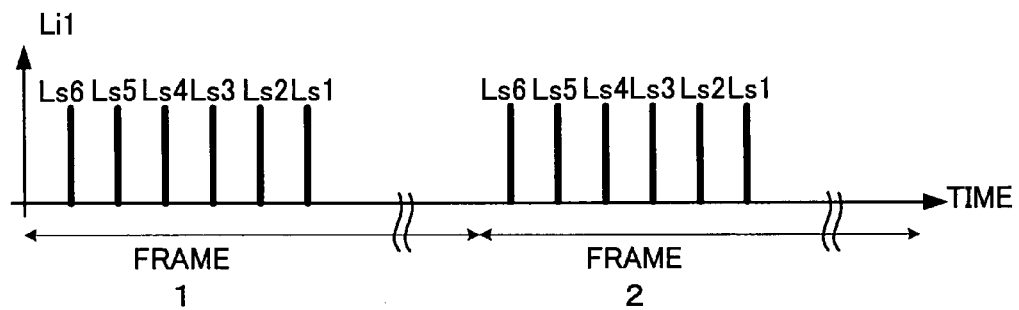
FIG. 5 is a diagram showing timing of main scanning and laser beams for the main scanning in the first scanning line of each frame in the image display apparatus according to the first embodiment.

FIG. 5 is a diagram showing timing of main scanning (display timing of scanning lines) and laser beams for a main scanning in the first scanning line Li1 of each frame in the image display apparatus according to the first embodiment. In FIG. 5, a vertical axis denotes brightness (intensity of laser beams) and a horizontal axis denotes time. As shown in FIG. 5, the first scanning line Li1 of each frame is displayed from the start of the frame sequentially by laser beams Ls6, Ls5, Ls4, Ls3, Ls2, and Ls1. An interval (PL in FIG. 4A) between the adjacent scanning lines by the laser beams Ls6, Ls5, Ls4, Ls3, Ls2, and Ls1 corresponds to a time of one main scanning. Since the brightness (the vertical axis of FIG. 5) of the scanning lines by the laser beams Ls6, Ls5, Ls4, Ls3, Ls2, and Ls1 are based on pixel data, the scanning lines are displayed with the same brightness. FIG. 5 shows a case when pixels are displayed with the maximum brightness (white). When such operation is repeated for each frame, an image is continued to be displayed.

Figure 6:
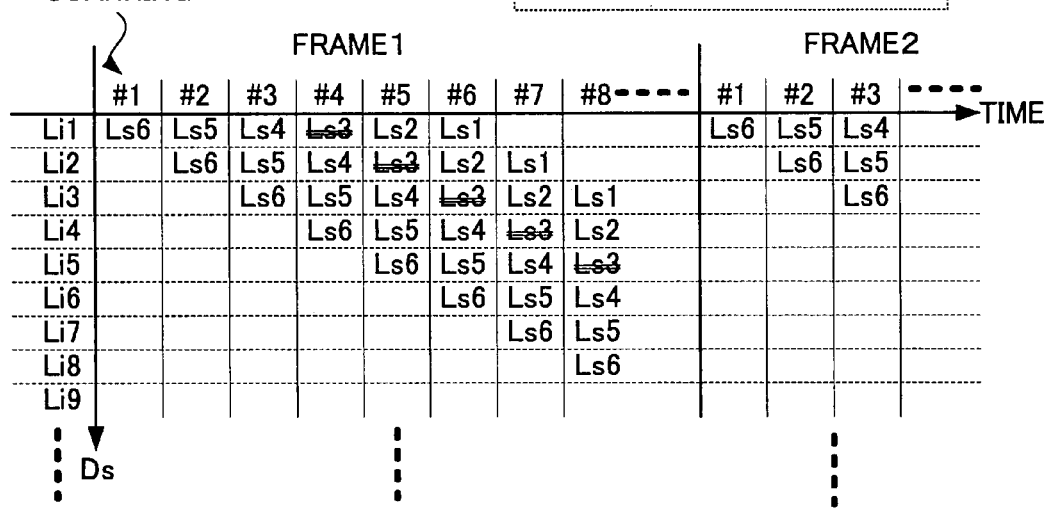
FIG. 6 is a diagram for explaining operation of the image display apparatus according to the first embodiment, and shows which laser beam of a plurality of laser beams displays the respective scanning lines when one of light emitting elements of a light source is faulty and cannot emit a laser beam.

FIG. 6 is a diagram for explaining operation of the image display apparatus according to the first embodiment, and shows which laser beam of a plurality of laser beams displays the respective scanning lines Li1, Li2, . . . when one of light emitting elements (the light emitting element 63 shown in FIG. 3) in the light source 6 is faulty (defective) and cannot emit the laser beam Ls3. FIGS. 7A and 7B are diagrams for explaining operation of the image display apparatus according to the first embodiment when one (the light emitting element 63 shown in FIG. 3) in the light source is faulty and cannot emit the laser beam Ls3, wherein FIG. 7A shows timing of main scanning and laser beams for the main scanning in the first scanning line Li1 of each frame, and FIG. 7B shows timing of main scanning and laser beams for the main scanning in the second scanning line Li2 of each frame.

As shown in FIG. 6 and FIGS. 7A and 7B, since the laser beam Ls3 cannot be emitted when displaying the scanning lines, an image to be displayed become darker than an image in the absence of the faulty light emitting elements. In the first embodiment, however, a distance of movement of a laser beam irradiation position on the image display screen 9 moved by one sub-scanning is set at a value obtained by multiplying an interval (the interval PL in FIG. 4A) by a predetermined integer (which is one in the first embodiment), which is an integer smaller than the number of a plurality of light beams arranged in the direction corresponding to the sub-scanning direction. Through such control, a ratio of number of faulty light emitting element(s) to total number of the light emitting elements of the light source 6 becomes the same for each scanning line. For this reason, an image with irregularity in brightness (that is, having brightness varying among the scanning lines) can be prevented even when the light source has a defection on any of the light emitting elements.

When variations in light emission characteristic between the light emitting elements are ignored, the brightness of an image is proportional to $(N_E - N_{DE})/N_E$, where $N_E$ is number of light emitting elements and $N_{DE}$ is number of faulty light emitting elements.

Accordingly, the more the number of light emitting elements $N_E$ in the light source is, the less the influence to the brightness of an image per one faulty light emitting element is.

As has been described above, in the image display apparatus and the image display method according to the first embodiment, a plurality of laser beams are arranged in a direction corresponding to the sub-scanning direction, and one sub-scanning is carried out each time one main scanning is carried out. Thus, even when the light source 6 has a faulty light emitting element and cannot emit a light beam, an image can be displayed without any irregularities in brightness appearing in the image.

The image display apparatus and the image display method according to the first embodiment can advantageously suppress generation of flicker, since each pixel is displayed by a plurality of laser beams by a plurality of times and thus this becomes equivalent to such a state that the pixel is continued to be luminous for a predetermined time.

Although the above explanation has been made in connection with the case where the light source 6 outputs six laser beams arranged in the direction corresponding to the sub-scanning direction, the present invention is not limited to this example. Effects similar to the above can be obtained so long as the number of laser beams is two or more.

The above explanation has been made in connection with the case where the light source 6 has a plurality of light emitting elements arranged in six rows and in a single column (six elements in the direction corresponding to the sub-scanning direction and one element in the direction of the main scanning direction as shown in FIG. 3). However, the present invention is not limited to this example. Any number of light emitting elements may be arranged, for example, in six rows and in two columns to output any number of laser beams. In this case, each of the laser beams is modulated with pixel data corresponding to a beam irradiation position (that is, display pixel position) of the corresponding laser beam on the image display screen 9. In this case, further, when two laser beams arranged in the main scanning direction (horizontal direction) are applied at the same position, it can be considered that the two laser beams are modulated with the same pixel data.

Second Embodiment

In the above first embodiment, the distance of movement of the laser beam irradiation position on the image display screen 9 moved by one sub-scanning has been set at a value obtained by multiplying an interval (the interval PL in FIG. 4A) between adjacent two scanning lines in the sub-scanning direction Ds on the image display screen 9 by a predetermined integer of one, which is an integer smaller than the number of light beams arranged in the direction corresponding to the sub-scanning direction Ds. In the second embodiment, on the other hand, a distance of movement of the laser beam irradiation position on the image display screen 9 moved by one sub-scanning is set at a value obtained by multiplying an interval (the interval PL in FIG. 4A) between adjacent two scanning lines in the sub-scanning direction Ds on the image display screen 9 by a predetermined integer of two, which is an integer smaller than the number of a plurality of light beams arranged in the direction corresponding to the sub-scanning direction Ds. In this conjunction, so long as the distance of movement of the laser beam irradiation position on the image display screen 9 moved by one sub-scanning is set at a value obtained by multiplying the interval (the interval PL in FIG. 4A) between adjacent two scanning lines in the sub-scanning direction Ds on the image display screen 9 by a predetermined integer which is an integer smaller than the number of light beams arranged in the direction corresponding to the sub-scanning direction Ds, the predetermined integer may be three or more. In the following explanation, FIG. 1 and FIG. 3 are also referred to.

Figure 9A:
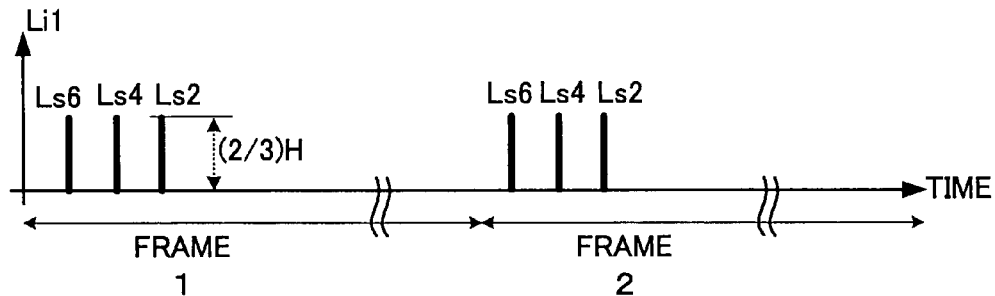
Figure 9B:
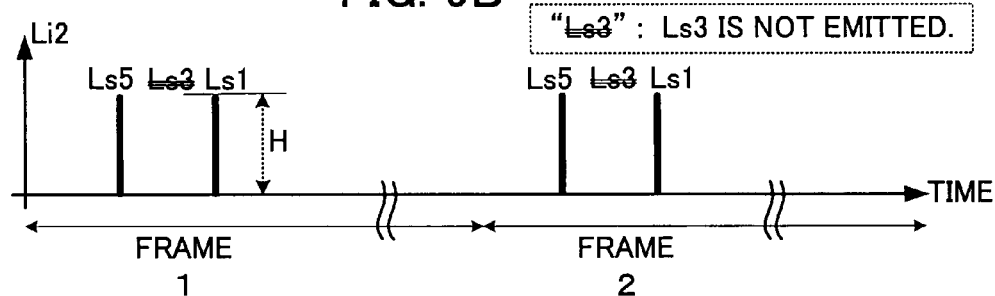

FIG. 8 is a diagram for explaining operation of the image display apparatus according to the second embodiment (that is, an image display method according to the second embodiment) of the present invention, and shows which laser beam of a plurality of laser beams displays the respective scanning lines Li1, Li2, . . . when one (the light emitting element 63 in FIG. 3) of light emitting elements in the light source 6 is faulty and cannot emit the laser beam Ls3. FIGS. 9A and 9B are diagrams for explaining operation of the image display apparatus according to the second embodiment when an element (the light emitting element 63 in FIG. 3) of the light emitting elements of the light source 6 is faulty and cannot emit the laser beam Ls3, wherein FIG. 9A shows timing of main scanning and laser beams for the main scanning in the first scanning line Li1 of each frame, and FIG. 9B shows timing of main scanning and laser beams for the main scanning in the second scanning line Li2 of each frame.

As shown in FIG. 8 and FIGS. 9A and 9B, since the laser beam Ls3 cannot be emitted when displaying each scanning line, its image becomes darker than an image in the absence of the faulty light emitting element. FIG. 8 and FIGS. 9A and 9B show a case when the laser beam Ls3 cannot be emitted from the light emitting element 63 like FIG. 6. When the distance of movement of the scanning line position in the sub-scanning direction Ds by one sub-scanning is twice the interval PL between the scanning lines, in the normal state, the first scanning line Li1 is displayed by the laser beams Ls6, Ls4, and Ls2; and the second scanning line Li2 is displayed by the laser beams Ls5, Ls3, and Ls1. However, since the faulty light emitting element 63 cannot emit the laser beam Ls3, the second scanning line Li2 is displayed with a brightness corresponding to ⅔ of brightness in the case where the light source has no faulty light emitting element.

To avoid the above problem, in the second embodiment, as shown in FIG. 9A, the light source driver 5 is controlled so that the intensity of the laser beams Ls6, Ls4, and Ls2 becomes ⅔ of the intensity H. As a result, the brightness of the scanning lines (Li2, Li4, . . . in FIG. 8) displayed by a combination of laser beams emitted from a group of light emitting elements including a faulty light emitting element can be made the same as the brightness of the scanning lines (Li1, Li3, . . . in FIG. 8) displayed by a combination of laser beams emitted from a group of light emitting elements including no faulty light emitting element, and thus irregularities can be prevented from appearing in an image by the light source 6 including a faulty light emitting element.

As has been described above, in the image display apparatus and the image display method according to the second embodiment, the plurality of laser beams of the light source 6 are arranged in the direction corresponding to the sub-scanning direction Ds, and the distance of movement of the display position of the scanning line by one sub-scanning is set at a value obtained by multiplying the interval PL between adjacent two scanning lines in the sub-scanning direction on the image display screen 9 by a predetermined integer of two, which is an integer smaller than the number of a plurality of light beams arranged in the direction corresponding to the sub-scanning direction. Thus, the intensities of laser beams are adjusted so that the sums of laser beams for use in the display of the scanning lines have each the same intensity. Even when a light emitting element of the light source 6 became faulty, an image can be displayed without any irregularities in the image.

Although the above explanation has been made in FIG. 8 in connection with the case where the same first scanning lines Li1 as the start of the sub-scanning of the respective frames are displayed, the scanning lines Li1 and Li2 may be displayed through the first main scanning.

The above explanation has been made in connection with the case where the luminous intensities of the laser beams are adjusted at (⅔)H by the light source driver 5 as shown in FIG. 9A. However, effects similar to the above can be obtained even when adjusting the intensities of the laser beams by lowering the gradation of the scanning lines displayed by a combination of laser beams emitted from a group of light emitting elements including no faulty light emitting element in accordance with a ration number of the faulty light emitting element(s) to total number of the light emitting elements.

Figure 10A:
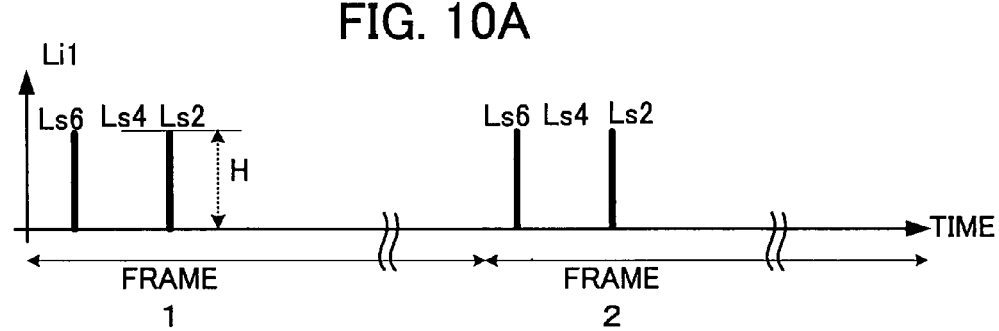
Figure 10B:
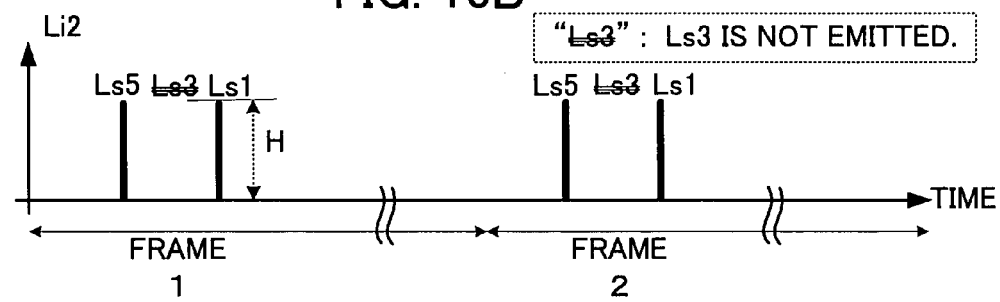

Explanation has been made in connection with the case where the intensities of the laser beams are adjusted by lowering the gradation of the scanning lines displayed by a combination of laser beams emitted from a group of light emitting elements including no faulty light emitting element in accordance with a ration number of the faulty light emitting element(s) to total number of the light emitting elements. However, effects similar to the above can be obtained by outputting black image data in such a way that the brightness of the odd-numbered scanning lines Li1, Li3, . . . displayed by a combination of laser beams emitted from a combination of light emitting elements including no faulty light emitting element is the same as the brightness of the even-numbered scanning lines Li2, Li4, . . . displayed by a combination of laser beams emitted from a combination of light emitting elements including a faulty light emitting element, as shown in FIGS. 10A and 10B. FIG. 10A shows a case when image data for the laser beam Ls4 as data for the first scanning line Li1 is black. In this connection, effects similar to the above can be obtained even when adjustment is made so that image data other than the image data of the laser beam Ls4 are black and the brightness of the even-numbered and odd-numbered scanning lines are made the same.

Except for the above described respects, the second embodiment is the same as the first embodiment.

Third Embodiment

Figure 11:
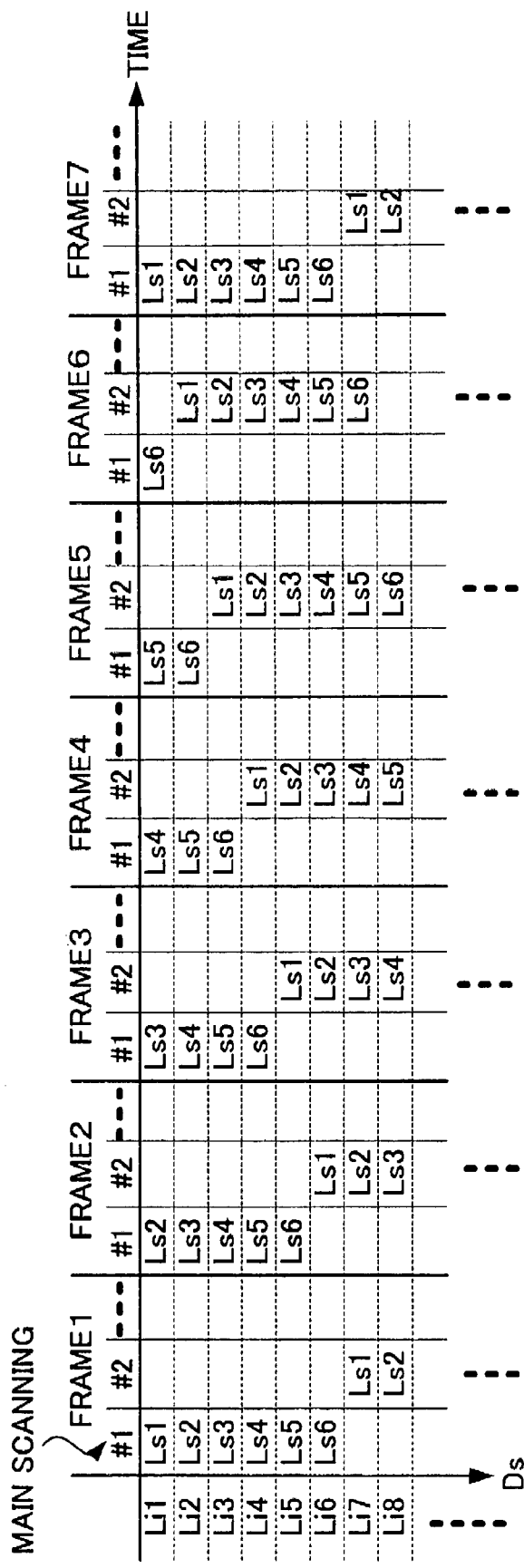
FIG. 11 is a diagram for explaining operation of an image display apparatus according to the third embodiment (that is, an image display method of the third embodiment) of the present invention, and shows which laser beam of a plurality of laser beams displays the respective scanning lines.

FIG. 11 is a diagram for explaining operation of an image display apparatus according to the third embodiment (an image display method according to the third embodiment) of the present invention, and shows which laser beam of a plurality of laser beams displays the respective scanning lines Ls1 to Ls6. In the following explanation, FIG. 1 and FIG. 3 are also referred to.

In the image display apparatus according to the third embodiment, the scan controller 7 controls the light scanning unit 8 with use of a control signal ds1 transmitted from the scan controller 7 to the light scanning unit 8 in such a way that scanning lines at the same light beam irradiation position are displayed by the main scanning of different light beams in a plurality of light beams arranged in the direction corresponding to the sub-scanning direction. In this example, the different light beams in the plurality of light beams arranged in the direction corresponding to the sub-scanning direction Ds are the adjacent light beams of the plurality of light beams arranged in the direction corresponding to the sub-scanning direction Ds, or are the light beams of the plurality of light beams arranged in the direction corresponding to the sub-scanning direction, which are located at both ends. For example, with respect to the first scanning lines Li1 of the frame 1 and the frame 2 in FIG. 11, the first scanning line Li1 of the previous frame (frame 1) is displayed by the laser beam Ls1, and the first scanning line Li1 of the current frame (frame 2) is displayed by the laser beam Ls2.

FIG. 11 shows a relation between a plurality of laser beams Ls1 to Ls6 emitted from the light source 6 and scanning lines Li1, Ls2, . . . . In one frame period, a distance of movement of a beam irradiation position on the image display screen 9 moved by one sub-scanning is obtained by multiplying the interval PL between adjacent two scanning lines in the sub-scanning direction on the image display screen 9 by a predetermined integer. In the third embodiment, the predetermined integer is six.

In the frame 1, the first to sixth scanning lines Li1 to Li6 are displayed by the laser beams Ls1 to Ls6 emitted from the light source 6 in the first main scanning (#1). In the second main scanning (#2), seventh to twelfth scanning lines Li7 to Li12 are displayed by the laser beams Ls1 to Ls6 emitted from the light source 6. In the frame 2, the scanning lines Li1 to Li5 are displayed by the laser beams Ls2 to Ls6 emitted from the light source 6 in the first main scanning (#1). In the second main scanning (#2), sixth to eleventh scanning lines Li6 to Li11 are displayed by the laser beams Ls1 to Ls6. In the frame 3, the first to fourth scanning lines Li1 to Li4 are displayed by the laser beams Ls3 to Ls6 in the first main scanning (#1). In the second main scanning (#2), the fifth to eleventh scanning lines Li5 to Li10 are displayed by the laser beams Ls1 to Ls6. In the frame 4, the first to third scanning lines Li1 to Li3 are displayed by the laser beams Ls4 to Ls6 of the light source 6 in the first main scanning (#1), and the fourth to ninth scanning lines are displayed by the laser beams Ls1 to Ls6 in the second main scanning (#2). In the frame 5, the first and second scanning lines Li1 and Li2 are displayed by the laser beams Ls5 and Ls6 of the light source 6 in the first main scanning (#1), and the third to eighth scanning lines Li3 to Li8 are displayed by the laser beams Ls1 to Ls6 in the second main scanning (#2). In the frame 6, the first scanning line Li1 is displayed by the laser beam Ls1 of the light source 6 in the first main scanning (#1), and the second to seventh scanning lines Li2 to Li7 are displayed by the laser beams Ls1 to Ls6 in the second main scanning (#2). In this manner, the start position of the sub-scanning is controlled so as to sequentially change the number of scanning lines to be scanned in the first main scanning (#1) for each frame.

FIGS. 12A and 12B are diagrams for explaining operation of the image display apparatus according to the third embodiment, wherein FIG. 12A shows timing of main scanning and laser beams for the main scanning in the first scanning line Li1 for each frame, and FIG. 12B shows timing of main scanning of the second scanning line Li2 for each frame and laser beams for the main scanning. As shown in FIGS. 12A and 12B, control is carried out so as to sequentially change the laser beam to display each scanning line for each frame. In other words, in the third embodiment, an image is displayed by moving a plurality of laser beams arranged in the direction corresponding to the sub-scanning direction Ds for each frame in the sub-scanning direction.

As has been described above, in the image display apparatus and the image display method according to the third embodiment, the sub-scanning is controlled so that the same scanning line on the image display screen 9 is scanned by laser beams emitted from different light emitting elements of the light source 6 by a plurality of times, thus reducing irregularities appearing in a display image caused by variations in characteristic between the plurality of light emitting elements of the light source 6 or caused by a defect light emitting element of the light source 6.

Figure 13:
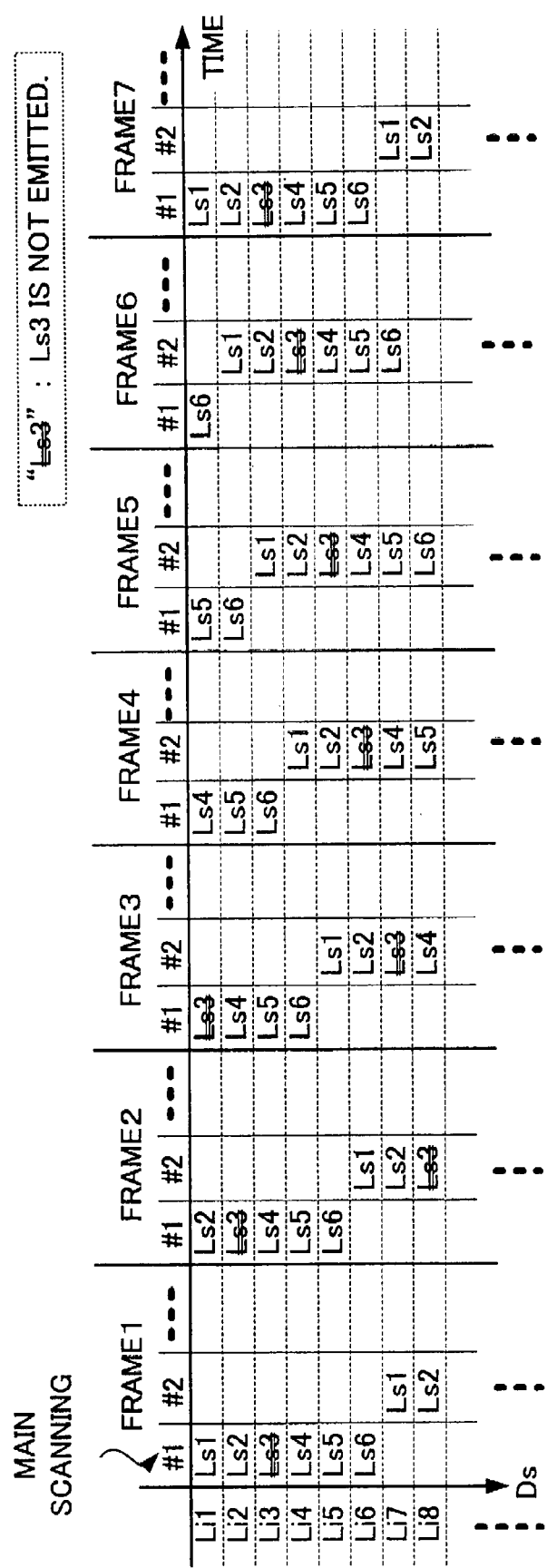
FIG. 13 is a diagram for explaining operation of the image display apparatus according to the third embodiment (that is, an image display method according to the third embodiment) of the present invention, and shows which laser beam of a plurality of laser beams displays the respective scanning lines when one of the light emitting elements in the light source and cannot emit a laser beam.

FIG. 13 is a diagram for explaining operation of the image display apparatus according to the third embodiment (the image display method according to the third embodiment), and shows which laser beam of a plurality of laser beams displays the respective scanning lines when one (the light emitting element 63 shown in FIG. 3) of light emitting elements of the light source 6 is faulty and cannot emit the laser beam Ls3. FIGS. 14A and 14B are diagrams for explaining operation of the image display apparatus according to the third embodiment when one (the light emitting element 63 shown in FIG. 3) of the light emitting elements of the light source is faulty and cannot emit the laser beam Ls3, wherein FIG. 14A shows timing of main scanning and laser beams for the main scanning in the first scanning line Li1 of each frame, and FIG. 14B shows timing of main scanning of the second scanning line Li2 in each frame and laser beams for the main scanning.

As shown in FIG. 13 and FIGS. 14A and 14B, since the laser beam Ls3 cannot be emitted when displaying each scanning line, an image displayed by the laser beam emitted from a combination of light emitting elements including a faulty light emitting element is darker than an image displayed by the laser beam emitted from a combination of light emitting elements including no faulty light emitting element. However, as shown in FIG. 13, when control is carried out so as to change laser beams for scanning of scanning lines for each frame (that is, so as to sequentially change the start position of the sub-scanning for each frame), ratios of no light irradiation by the faulty light emitting elements (defective beam ratios) in the scanning lines become the same when compared in terms of a display period of a plurality of frames. Thus a failure in the light emitting elements of the light source 6 can be prevented from resulting in that an irregular image (with varying brightness between the scanning lines) is displayed.

Except for the above described respects, the third embodiment is the same as the aforementioned first or second embodiment.

Fourth Embodiment

In the third embodiment, the distance of movement of the beam irradiation position in the sub-scanning direction Ds moved by laser beams on the image display screen 9 in the first sub-scanning has been set at the value obtained by multiplying the interval (the interval PL in FIG. 4A) between adjacent two scanning lines in the sub-scanning direction Ds on the image display screen 9 by six, which is the number of a plurality of light beams arranged in the direction corresponding to the sub-scanning direction Ds. However, the distance of movement of the beam irradiation position in the sub-scanning direction Ds by laser beams on the image display screen 9 in the one sub-scanning may be set at a value obtained by multiplying the interval (the interval PL in FIG. 4A) between adjacent two scanning lines in the sub-scanning direction on the image display screen 9 by a predetermined integer which is an integer smaller than the number of a plurality of light beams arranged in the direction corresponding to the sub-scanning direction. In the fourth embodiment, the predetermined integer is three. However, the predetermined integer is not limited to three. In the following explanation, FIG. 1 and FIG. 3 are also referred to.

FIG. 15 is a diagram for explaining operation of an image display apparatus according to the fourth embodiment (that is, an image display method according to the fourth embodiment) of the present invention, and shows which laser beam of a plurality of laser beams Ls1 to Ls6 displays the respective scanning lines Li1, Li2 . . . .

As shown in FIG. 15, in the image display apparatus according to the fourth embodiment, the scan controller 7 controls the light scanning unit 8 in such a way that the scanning line at the same beam irradiation position is displayed by the main scanning of ones of the laser beams Ls1 to Ls6 arranged in the direction corresponding to the sub-scanning direction Ds which are different in the current and previous frames. In the example of FIG. 15, in the frame 1 and the frame 2, the scanning line Li1 at the same beam irradiation position is displayed by the main scanning of different ones of the laser beams Ls1 to Ls6 arranged in the direction corresponding to the sub-scanning direction. In FIG. 15, the first scanning line Li1 is scanned by the laser beams Ls4 and Ls1 in the frame 1, whereas, the first scanning line Li1 is scanned by the laser beams Ls5 and Ls2 in the frame 2.

As shown in FIG. 15, in the frame 1, the first to third scanning lines Li1 to Li3 are displayed by the laser beams Ls4 to Ls6 in the first main scanning (#1). In the second main scanning (#2), the first to sixth scanning lines Li1 to Li6 are displayed by the laser beams Ls1 to Ls6. In the third main scanning (#3), the fourth to ninth scanning lines Li4 to Li9 are displayed by the laser beams Ls1 to Ls6. In the frame 2, the first and second scanning lines Li1 and Li2 are displayed by the laser beams Ls5 and Ls6 in the first main scanning (#1), the first to fifth scanning lines Li1 to Li5 are displayed by the laser beams Ls2 to Ls6 in the second main scanning (#2), and the third to eighth scanning lines Li3 to Li8 are displayed by the laser beams Ls1 to Ls6 in the third main scanning (#3). In the frame 3, the first scanning line Li1 is displayed by the laser beam Ls6 in the first main scanning (#1), the first to fourth scanning lines Li1 to Li4 are displayed by the laser beams Ls3 to Ls6 in the second main scanning (#2), and the second to seventh scanning lines Li2 to Li7 are displayed by the laser beams Ls1 to Ls6 in the third main scanning (#3).

FIG. 16 is a diagram for explaining operation of the image display apparatus according to the fourth embodiment, and shows timing of main scanning (display timing) and laser beams displayed for the main scanning in the first scanning line Li1 of each frame. As shown in FIG. 16, control is carried out so as to sequentially change laser beams for scanning in each frame. Thus even when laser beams have irregular brightness, irregularities in an image can advantageously be prevented from appearing in the image.

FIG. 17 is a diagram for explaining operation of the image display apparatus according to the fourth embodiment. FIG. 17 shows which laser beam of a plurality of laser beams displays the respective scanning lines Ls1 to Ls6 when one (the light emitting element 63 in FIG. 3) of the light emitting elements 61 to 66 of the light source 6 is faulty and cannot emit the laser beam Ls3. FIGS. 18A and 18B are diagrams for explaining operation of the image display apparatus according to the fourth embodiment when one (the light emitting element 63 in FIG. 3) of the light emitting elements 61 to 66 of the light source 6 becomes faulty and cannot emit the laser beam Ls3. FIG. 18A shows timing of main scanning and laser beams for the main scanning in the first scanning line Li1 of each frame, and FIG. 18B shows timing of main scanning of the second scanning line Li2 in each frame and laser beams for the main scanning. As shown in these figures, in a period of a plurality of frames, the sub-scanning start positions are controlled to be different in different frames so that pixels of each scanning line are displayed by all the laser beams. Thus, even when any of the light emitting elements (i.e., part of the light source 6) is faulty and cannot emit any of the laser beams, irregularities can be prevented from appearing in the displayed image.

As has been described above, in the image display apparatus and the image display method according to the fourth embodiment, the plurality of laser beams are arranged in the direction corresponding to the sub-scanning direction Ds and control is carried out so that the sub-scanning interval is smaller than the number of laser beams arranged in the direction corresponding to the sub-scanning direction. As a result, even when the light source 6 has a fault light emitting element, an image can be displayed without any irregularities appearing in the image.

The image display apparatus according to the fourth embodiment is arranged so that the sub-scanning start position is sequentially changed in each frame. Thus, even when the light source 6 has a faulty light emitting element, an image can be displayed without any irregularities appearing in the image.

Except for the above described respects, the fourth embodiment is the same as the aforementioned third embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An image display apparatus comprising:
    a light source which includes a plurality of light emitting elements for emitting a plurality of light beams arranged in a direction corresponding to a sub-scanning direction on an image display screen;
    a light source driver which individually modulates intensities of the plurality of light beams in accordance with input image data;
    a light scanning unit which performs main scanning and sub-scanning in such a way that light irradiation positions on the image display screen that are irradiated with the plurality of light beams are moved in a main scanning direction on the image display screen during the main scanning and the light irradiation positions are moved in the sub-scanning direction during the sub-scanning;
    the image display screen which receives the plurality of light beams scanned in the main scanning direction and the sub-scanning direction by the light scanning unit, thereby causing an image to be displayed; and
    a controller which controls the light scanning unit so as to perform one sub-scanning each time that the plurality of light beams are scanned in the main scanning direction;
    wherein, in one frame period, a distance of movement of the light irradiation positions on the image display screen moved by one sub-scanning is a distance obtained by multiplying an interval between adjacent two scanning lines in the sub-scanning direction on the image display screen by a predetermined integer which is an integer smaller than number of the plurality of light beams arranged in the direction corresponding to the sub-scanning direction.

2. The image display apparatus according to claim 1, wherein the predetermined integer is one.

3. The image display apparatus according to claim 1, wherein the predetermined integer is two or higher.

4. The image display apparatus according to claim 3, wherein the light source driver weakens any of the intensities of the plurality of light beams emitted from the plurality of light emitting elements or prevents turning-on of any of the plurality of light emitting elements so as to make brightness of the scanning lines uniform.

5. An image display apparatus comprising:
    a light source which includes a plurality of light emitting elements for emitting a plurality of light beams arranged in a direction corresponding to a sub-scanning direction on an image display screen;
    a light source driver which individually modulates intensities of the plurality of light beams in accordance with input image data;
    a light scanning unit which performs main scanning and sub-scanning in such a way that light irradiation positions on the image display screen that are irradiated with the plurality of light beams are moved in a main scanning direction on the image display screen during the main scanning and the light irradiation positions are moved in the sub-scanning direction during the sub-scanning;
    the image display screen which receives the plurality of light beams scanned in the main scanning direction and the sub-scanning direction by the light scanning unit, thereby causing an image to be displayed; and
    a controller which controls the light scanning unit so as to perform one sub-scanning each time that the plurality of light beams are scanned in the main scanning direction;
    wherein the controller controls the light scanning unit in such a way that scanning lines of the main scanning at the same light irradiation position in previous frame and current frame are displayed by the main scanning of different ones of the plurality of light beams arranged in the direction corresponding to the sub-scanning direction.

6. The image display apparatus according to claim 5, wherein the different ones of the plurality of light beams arranged in the direction corresponding to the sub-scanning direction are adjacent ones of the plurality of light beams arranged in the direction corresponding to the sub-scanning direction, or ones of the plurality of light beams arranged in the direction corresponding to the sub-scanning direction which are located at both ends of the plurality of light beams.

7. The image display apparatus according to claim 5, wherein, in one frame period, a distance of movement of the light irradiation positions on the image display screen moved by one sub-scanning is a distance obtained by multiplying an interval between adjacent two scanning lines in the sub-scanning direction on the image display screen by a predetermined integer which is an integer smaller than number of the plurality of light beams arranged in the direction corresponding to the sub-scanning direction.

8. The image display apparatus according to claim 7, wherein the predetermined integer is equal to the number of the plurality of light beams arranged in the direction corresponding to the sub-scanning direction.

9. The image display apparatus according to claim 7, wherein the predetermined integer is smaller than the number of the plurality of light beams arranged in the direction corresponding to the sub-scanning direction.

10. An image display method comprising the steps of:
    emitting a plurality of light beams arranged in a direction corresponding to a sub-scanning direction on an image display screen from a plurality of light emitting elements of a light source, intensities of the plurality of light beams being individually modulated in accordance with input image data; and
    performing main scanning and sub-scanning by a light scanning unit in such a way that light irradiation positions on the image display screen that are irradiated with the plurality of light beams are moved in a main scanning direction on the image display screen during the main scanning and the light irradiation positions are moved in the sub-scanning direction during the sub-scanning, one sub-scanning being performed each time that the plurality of light beams are scanned in the main scanning direction;

wherein, in one frame period, a distance of movement of the light irradiation positions on the image display screen moved by one sub-scanning is a distance obtained by multiplying an interval between adjacent two scanning lines in the sub-scanning direction on the image display screen by a predetermined integer which is an integer smaller than number of the plurality of light beams arranged in the direction corresponding to the sub-scanning direction.

11. The image display method according to claim 10, wherein the predetermined integer is one.

12. The image display method according to claim 10, wherein the predetermined integer is two or higher.

13. The image display method according to claim 12, wherein any of the intensities of the plurality of light beams emitted from the plurality of light emitting elements is weakened or turning-on of any of the plurality of light emitting elements is prevented so as to make brightness of the scanning lines uniform.

14. An image display method comprising the steps of:

emitting a plurality of light beams arranged in a direction corresponding to a sub-scanning direction on an image display screen from a plurality of light emitting elements of a light source, intensities of the plurality of light beams being individually modulated in accordance with input image data; and performing main scanning and sub-scanning by a light scanning unit in such a way that light irradiation positions on the image display screen that are irradiated with the plurality of light beams are moved in a main scanning direction on the image display screen during the main scanning and the light irradiation positions are moved in the sub-scanning direction during the sub-scanning, one sub-scanning being performed each time that the plurality of light beams are scanned in the main scanning direction;

wherein the controller controls the light scanning unit in such a way that scanning lines of the main scanning at the same light irradiation position in previous frame and current frame are displayed by the main scanning of different ones of the plurality of light beams arranged in the direction corresponding to the sub-scanning direction.

15. The image display method according to claim 14, wherein the different ones of the plurality of light beams arranged in the direction corresponding to the sub-scanning direction are adjacent ones of the plurality of light beams arranged in the direction corresponding to the sub-scanning direction, or ones of the plurality of light beams arranged in the direction corresponding to the sub-scanning direction which are located at both ends of the plurality of light beams.

16. The image display method according to claim 14, wherein, in one frame period, a distance of movement of the light irradiation positions on the image display screen moved by one sub-scanning is a distance obtained by multiplying an interval between adjacent two scanning lines in the sub-scanning direction on the image display screen by a predetermined integer which is an integer smaller than number of the plurality of light beams arranged in the direction corresponding to the sub-scanning direction.

17. The image display method according to claim 16, wherein the predetermined integer is equal to the number of the plurality of light beams arranged in the direction corresponding to the sub-scanning direction.

18. The image display method according to claim 16, wherein the predetermined integer is smaller than the number of the plurality of light beams arranged in the direction corresponding to the sub-scanning direction.

* * * * *